(12) United States Patent
Asami et al.

(10) Patent No.: US 7,731,628 B2
(45) Date of Patent: Jun. 8, 2010

(54) CONTROL APPARATUS FOR VEHICLE AND METHOD OF CONTROLLING VEHICLE

(75) Inventors: Tomohiro Asami, Nisshin (JP); Toshio Sugimura, Nagoya (JP); Takaaki Tokura, Nagoya (JP); Nobufusa Kobayashi, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 543 days.

(21) Appl. No.: 11/879,513

(22) Filed: Jul. 18, 2007

(65) Prior Publication Data

US 2008/0039286 A1 Feb. 14, 2008

(30) Foreign Application Priority Data

Aug. 10, 2006 (JP) ............................. 2006-218678

(51) Int. Cl.
*B60W 10/06* (2006.01)
*B60W 10/10* (2006.01)
(52) U.S. Cl. ........................................ 477/107; 477/143
(58) Field of Classification Search .................. 477/115
See application file for complete search history.

(56) References Cited

U.S. PATENT DOCUMENTS

| 7,282,010 B2* | 10/2007 | Iriyama et al. ............... 477/107 |
| 2007/0032340 A1* | 2/2007 | Hrovat et al. ................ 477/107 |

FOREIGN PATENT DOCUMENTS

| JP | A 02-042268 | 2/1990 |
| JP | A 08-175229 | 7/1996 |
| JP | A 10-184410 | 7/1998 |
| JP | A 10-238620 | 9/1998 |
| JP | A 2001-248466 | 9/2001 |
| JP | A 2004-316831 | 11/2004 |
| JP | A-2004-316838 | 11/2004 |
| JP | A-2004-330850 | 11/2004 |
| KR | A 2002-0079544 | 10/2002 |

OTHER PUBLICATIONS

U.S. Appl. No. 11/879,507, filed Jul. 18, 2007 in the name of Tomohiro Asami et al.
U.S. Appl. No. 11/879,502, filed Jul. 18, 2007 in the name of Tomohiro Asami et al.
U.S. Appl. No. 11/879,515, filed Jul. 18, 2007 in the name of Tomohiro Asami et al.

* cited by examiner

*Primary Examiner*—Sherry L Estremsky
*Assistant Examiner*—Edwin A. Young
(74) *Attorney, Agent, or Firm*—Oliff & Berridge, PLC

(57) ABSTRACT

A control apparatus for a vehicle includes an engagement-pressure control portion that increases the engagement pressure to a predetermined pressure for a friction engagement element to be engaged during a torque phase of an upshift in an automatic transmission. When the inertia phase starts, the control apparatus increases the engagement pressure at a predetermined gradient. The control apparatus also includes a torque-boost control portion that executes a torque-boost control that boosts the torque output from the power source during the torque phase; and a torque-boost permission portion that determines whether the torque-boost control should be restricted. When it is determined that the torque-boost control should not be restricted, the predetermined pressure is set to a greater value, and the predetermined gradient is set to a smaller value than when it is determined that the torque-boost control should be restricted.

8 Claims, 7 Drawing Sheets

FIG. 3

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGED
× DISENGAGED
◎ ENGAGED WHEN ENGINE BRAKE IS APPLIED
△ ENGAGED ONLY WHEN ENGINE DRIVES WHEELS

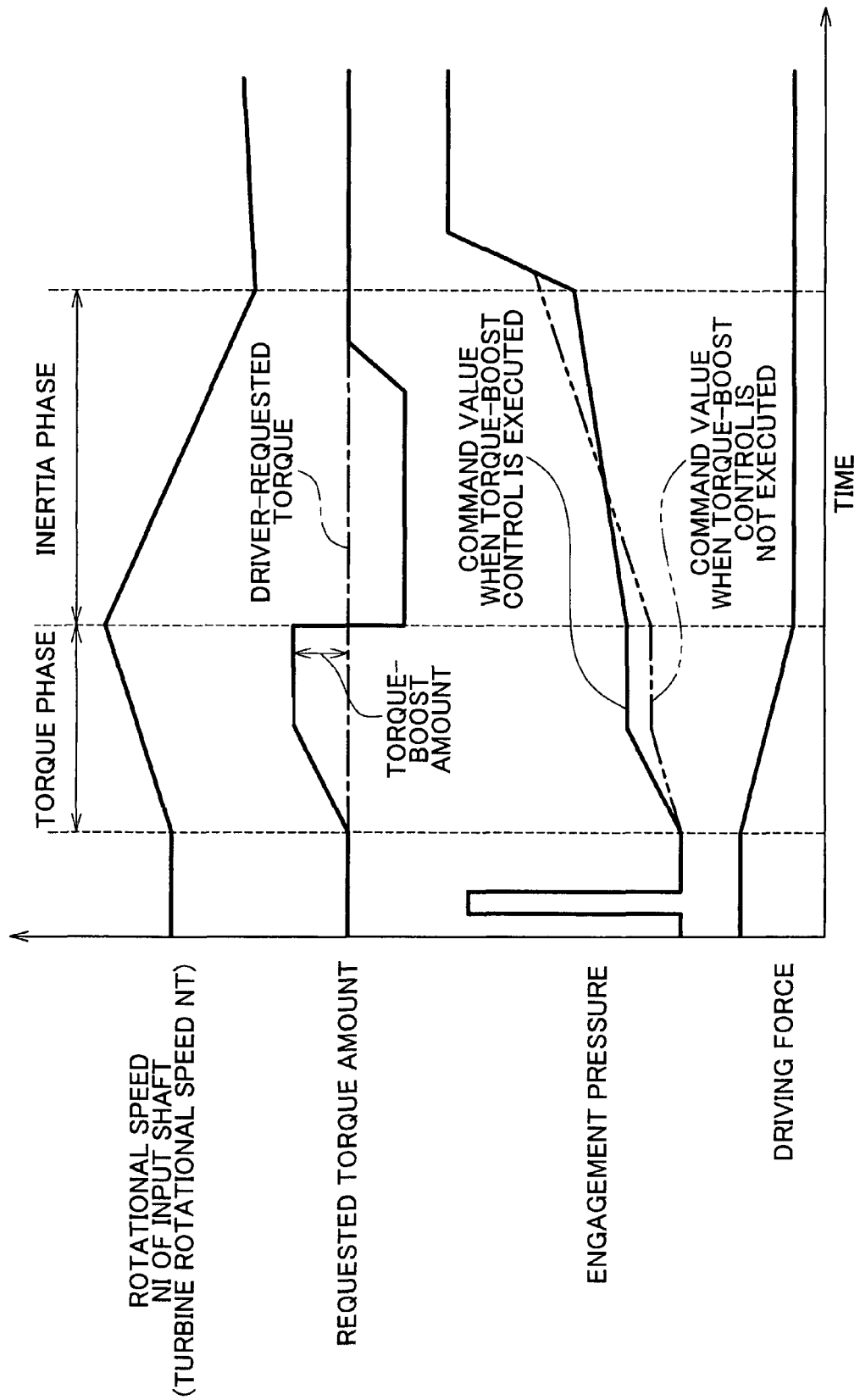

CONTROL APPARATUS FOR VEHICLE AND METHOD OF CONTROLLING VEHICLE

INCORPORATION BY REFERENCE

The disclosure of Japanese Patent Application No. 2006-218678 filed on Aug. 10, 2006, including the specification, drawings and abstract is incorporated herein by reference in its entirety.

BACKGROUND OF THE INVENTION

1. Field of the Invention

The invention relates to a control apparatus for a vehicle, and a method of controlling a vehicle. More specifically, the invention relates to a technology in which a torque output from a power source is boosted during a torque phase when an automatic transmission upshifts.

2. Description of the Related Art

When an automatic transmission upshifts, a driving force decreases during a torque phase, and then the driving force increases and a shock occurs when the torque phase ends and an inertia phase starts. To suppress the shock when the automatic transmission shifts, the technology in which the torque is boosted during the torque phase is proposed.

Japanese Patent Application Publication No. 2004-316838 (JP-A-2004-316838) describes a shift control apparatus for an automatic transmission, which executes a torque-boost control to boost torque output from a power source so that the automatic transmission shifts in an expected manner. The shift control apparatus includes an upper limit calculation portion, a torque calculation portion, a target engagement pressure setting portion, a torque control portion, and a friction element control portion. When an instruction is provided to perform the gear shift, the upper limit calculation portion calculates the upper limit value of the torque that may be output from the power source during the gear shift. When the instruction is provided to perform the gear shift, the torque calculation portion calculates the torque to be output from the power source when the torque is boosted. When it is determined that the calculated torque exceeds the calculated upper limit value, the target engagement pressure setting portion sets a target engagement pressure for a friction element to be engaged during the gear shift, based on the calculated upper limit value. When it is determined that the calculated torque exceeds the calculated upper limit value, the torque control portion controls the power source so that the torque output from the power source is equal to the calculated upper limit value during the gear shift. When it is determined that the calculated torque exceeds the calculated upper limit value, the friction element control portion controls the friction element so that the engagement pressure is equal to the target engagement pressure during the gear shift. As the upper limit value of the torque decreases, the target engagement pressure ("shelf pressure" described below) decreases.

The shift control apparatus described in the above publication corrects the engagement pressure for the friction engagement element through a feed-forward control to compensate for insufficiency in torque boost because of the upper limit value. Because the engagement pressure for the friction element is corrected through the feed-forward control, it is possible to avoid a problem relating to slow response, which would arise if the engagement pressure is corrected through a feedback control. Thus, it is possible to reduce the amount by which the output torque changes immediately after the torque phase ends during the gear shift.

When the automatic transmission upshifts, the engagement pressure for the friction engagement element to be engaged is maintained at a predetermined pressure (shelf pressure) during the torque phase, and then the engagement pressure is increased at a predetermined gradient during an inertia phase. In the shift control apparatus described in the above publication, the engagement pressure is determined based on the torque input to the automatic transmission during the torque phase. When the torque-boost control is restricted during the torque phase, the engagement pressure during the torque phase is smaller than when the torque-boost control is not restricted during the torque phase. In other words, when the torque-boost control is not restricted during the torque phase, the engagement pressure during the torque phase is greater than when the torque-boost control is restricted during the torque phase. Thus, if the gradient of the engagement pressure during the inertia phase is set regardless of the torque-boost control during the torque phase, and the torque-boost control is not restricted during the torque phase, the engagement pressure is high at the start of the inertia phase, and therefore, the engagement pressure is high at the end of the inertia phase, that is, when the friction engagement element is engaged. This may cause a shock.

SUMMARY OF THE INVENTION

A first aspect of the invention relates to a control apparatus for a vehicle that includes a power source, and an automatic transmission, connected to the power source, in which a gear is selected from among a plurality of gears with different gear ratios by selectively engaging a plurality of friction engagement elements. The control apparatus includes an engagement-pressure control portion, a torque-boost control portion, and a torque-boost permission portion. The engagement-pressure control portion controls an engagement pressure for a friction engagement element to be engaged when the automatic transmission upshifts so that the engagement pressure increases to a predetermined pressure during a torque phase, and the engagement pressure increases from the predetermined pressure at a predetermined gradient when an inertia phase starts. The torque-boost control portion executes a torque-boost control that boosts torque output from the power source during the torque phase. The torque-boost permission portion determines whether the torque-boost control should be restricted during the torque phase. When the torque-boost permission portion determines that the torque-boost control should not be restricted, the engagement-pressure control portion sets the predetermined pressure to a greater value, and sets the predetermined gradient to a smaller value than when the torque-boost permission portion determines that the torque-boost control should be restricted.

According to the first aspect, when the engagement pressure is great during the torque phase, the engagement pressure is increased at a small gradient during the inertia phase. This reduces the possibility that the engagement pressure is higher than necessary at the end of the inertia phase, that is, when the friction engagement element is engaged. As a result, a shock is reduced during the gear shift.

A second aspect of the invention relates to a method of controlling a vehicle that includes a power source, and an automatic transmission, connected to the power source, in which a gear is selected from among a plurality of gears with different gear ratios by selectively engaging a plurality of friction engagement elements. The method includes increasing an engagement pressure for a friction engagement element to be engaged when the automatic transmission upshifts to a predetermined pressure during a torque phase, and increasing the engagement pressure from the predetermined pressure at a predetermined gradient when an inertia phase starts; executing a torque-boost control that boosts torque output from the power source during the torque phase; and determining whether the torque-boost control should be restricted. When it is determined that the torque-boost control should not be restricted, the predetermined pressure is set to a greater value, and the predetermined gradient is set to a smaller value than when it is determined that the torque-boost control should be restricted.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 3 is a diagram showing an operation table for the automatic transmission;

FIG. 7 is a timing chart showing changes in an engagement pressure according to the embodiment of the invention.

DETAILED DESCRIPTION OF THE EXAMPLE EMBODIMENTS

Figure 1:
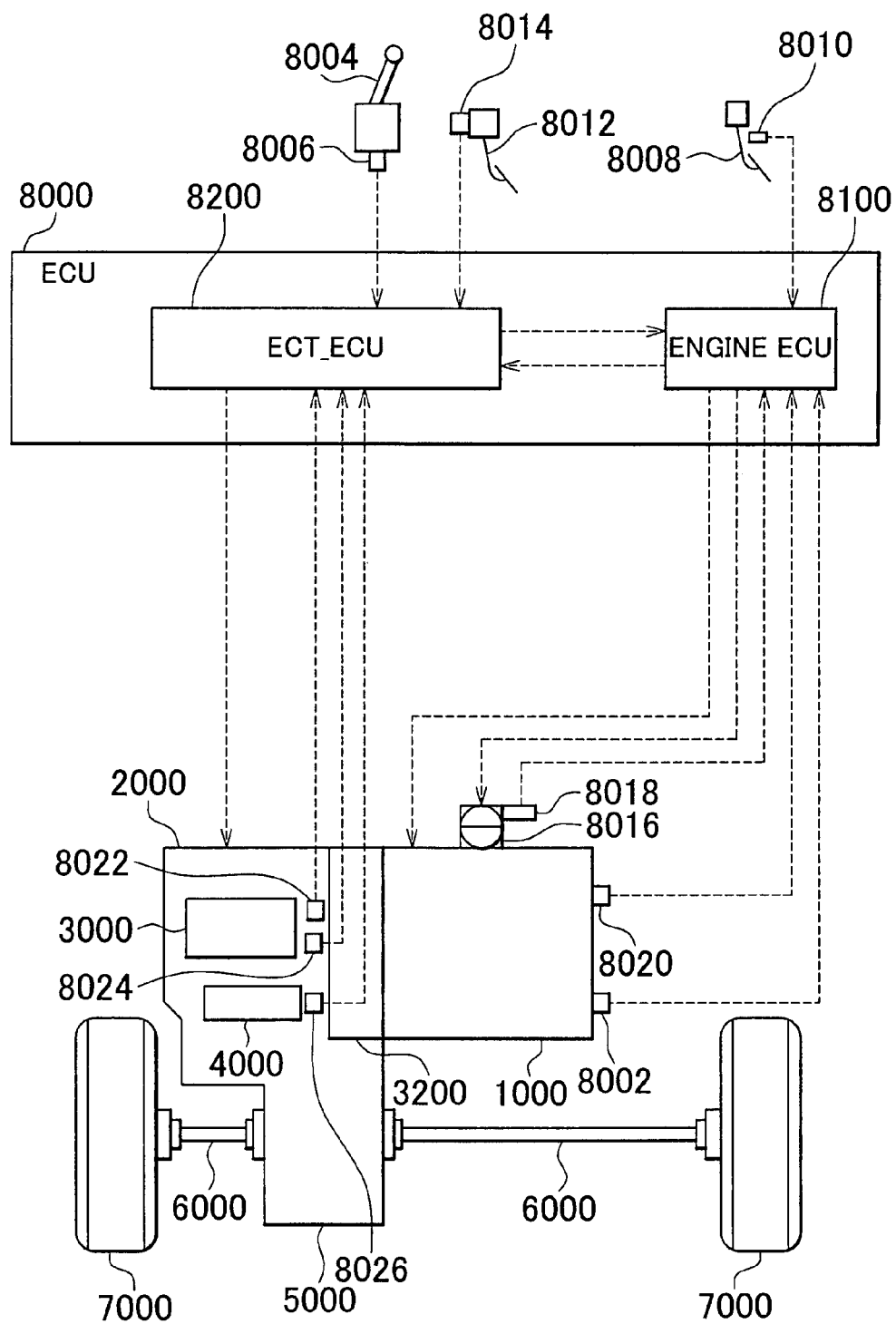
FIG. 1 is a schematic diagram showing the configuration of the power train of a vehicle.

Hereinafter, embodiments of the invention will be described with reference to the drawings. In the following description, the same and corresponding components are denoted by the same reference numerals, and have the same names and the same functions. Therefore, the detailed description thereof will not be repeated.

A vehicle provided with a control apparatus according to an embodiment of the invention will be described with reference to FIG. 1. The vehicle is a front-engine front-drive vehicle. The control apparatus according to the invention may be provided in a vehicle other than the front-engine front-drive vehicle.

The vehicle includes an engine 1000, an automatic transmission 2000; a planetary gear unit 3000 that constitutes a part of the automatic transmission 2000; a hydraulic circuit 4000 that constitutes a part of the automatic transmission 2000; a differential gear 5000; a drive shaft 6000; front wheels 7000; and an ECU (Electronic Control Unit) 8000. The control apparatus according to the embodiment may be implemented, for example, by executing a program stored in the ROM (Read Only Memory) of the ECU 8000.

The engine 1000 is an internal combustion engine in which mixture of air and fuel injected from an injector (not shown) is burned in the combustion chamber of each cylinder. A piston is pushed down in the cylinder by combustion, and thus a crankshaft is rotated. Instead of, or in addition to the engine 1000, a motor may be employed as a power source.

The automatic transmission 2000 is connected to the engine 1000 via a torque converter 3200. When a desired gear is selected in the automatic transmission 2000, the rotational speed of the crankshaft input to the automatic transmission 2000 changes to the desired rotational speed.

The output gear of the automatic transmission 2000 engages with the differential gear 5000. The differential gear 5000 is connected to a drive shaft 6000, for example, using a spline. Power is transmitted to the front right and front left wheels 7000 via the drive shaft 6000.

The ECU 8000 is connected to a coolant-temperature sensor 8002, a position switch 8006 for a shift lever 8004, an accelerator-pedal operation amount sensor 8010 for an accelerator pedal 8008, a brake-pedal force sensor 8014 for a brake pedal 8012, a throttle-valve opening amount sensor 8018 for an electronic throttle valve 8016, an engine speed sensor 8020, an input-shaft rotational speed sensor 8022, an output-shaft rotational speed sensor 8024, and an oil-temperature sensor 8026, for example, via harness.

The coolant-temperature sensor 8002 detects the temperature of coolant for the engine 1000 (hereinafter, referred to as "coolant temperature"), and transmits a signal that indicates the detected coolant temperature to the ECU 8000. The position switch 8006 detects the position of the shift lever 8004, and transmits a signal that indicates the detected shift lever position to the ECU 8000. The gear is automatically selected in the automatic transmission 2000, according to the position of the shift lever 8004. A manual shift mode may also be selected. When the manual shift mode is selected, a driver may select any gear by manual operation.

The accelerator-pedal operation amount sensor 8010 detects the operation amount of the accelerator pedal 8008, and transmits a signal that indicates detected operation amount to the ECU 8000. The brake-pedal force sensor 8014 detects the force applied to the brake pedal 8012, and transmits a signal that indicates the detected force to the ECU 8000.

The throttle-valve opening amount sensor 8018 detects the opening amount of the electronic throttle valve 8016, and transmits a signal that indicates the detected opening amount to the ECU 8000. The opening amount of the electronic throttle valve 8016 is adjusted by an actuator. The electronic throttle valve 8016 adjusts the amount of air taken into the engine 1000 (i.e., output from the engine 1000).

The amount of air taken into the engine 1000 may be adjusted by adjusting the lifts of an intake valve (not shown) and an exhaust valve (not shown), or the rotational phases for opening/closing the intake valve and exhaust valve, instead of, or in addition to operating the electronic throttle valve 8016.

The engine speed sensor 8020 detects the rotational speed of the crankshaft of the engine 1000, and transmits a signal that indicates the detected crankshaft speed to the ECU 8000. The input-shaft rotational speed sensor 8022 detects the rotational speed NI of the input shaft of the automatic transmission 2000 (i.e., the rotational speed NT of the turbine of the torque converter 3200), and transmits a signal that indicates the detected input shaft speed to the ECU 8000. The output-shaft rotational speed sensor 8024 detects the rotational speed NO of the output shaft of the automatic transmission 2000, and transmits a signal that indicates the detected output shaft speed to the ECU 8000.

The oil-temperature sensor 8026 detects the temperature of automatic transmission fluid (ATF), used for operating and lubricating the automatic transmission 2000, and transmits the detected ATF temperature to the ECU 8000.

The ECU 8000 controls devices so that the vehicle moves in a desired state, based on the signals transmitted from the coolant-sensor 8002, position switch 8006, accelerator-pedal operation amount sensor 8010, brake-pedal force sensor

8014, throttle-valve opening amount sensor 8018, engine speed sensor 8020, input-shaft rotational speed sensor 8022, output-shaft rotational speed sensor 8024, oil-temperature sensor 8026, and the like, and maps and programs stored in the ROM (Read Only Memory).

In this embodiment, when the shift lever 8004 is at the position D (Drive), and accordingly the D (Drive) range is selected in the automatic transmission 2000, the ECU 8000 controls the automatic transmission 2000 so that one of a first gear to a sixth gear is selected. When one of the first gear to the sixth gear is selected, the automatic transmission 2000 transmits driving force to the front wheels 7000. In the D range, at least one higher gear than the sixth gear may be provided. That is, for example, a seventh gear and an eighth gear may be provided. The gear is selected based on a shift diagram that is made in advance, for example, empirically. In the shift diagram, the vehicle speed and accelerator-pedal operation amount are used as parameters.

As shown in FIG. 1, the ECU 8000 includes an engine ECU 8100 that controls the engine 1000, and an ECT (Electronic Controlled Transmission)_ECU 8200 that controls the automatic transmission 2000.

The engine ECU 8100 transmits/receives signals to/from the ECT_ECU 8200. In this embodiment, the engine ECU 8100 transmits the signal that indicates the accelerator-pedal operation amount and the signal that indicates the coolant temperature to the ECT_ECU 8200. The ECT_ECU 8200 transmits the signal that indicates a requested torque amount that is defined as "torque that needs to be output from the engine 1000" to the engine ECU 8100.

Figure 2:
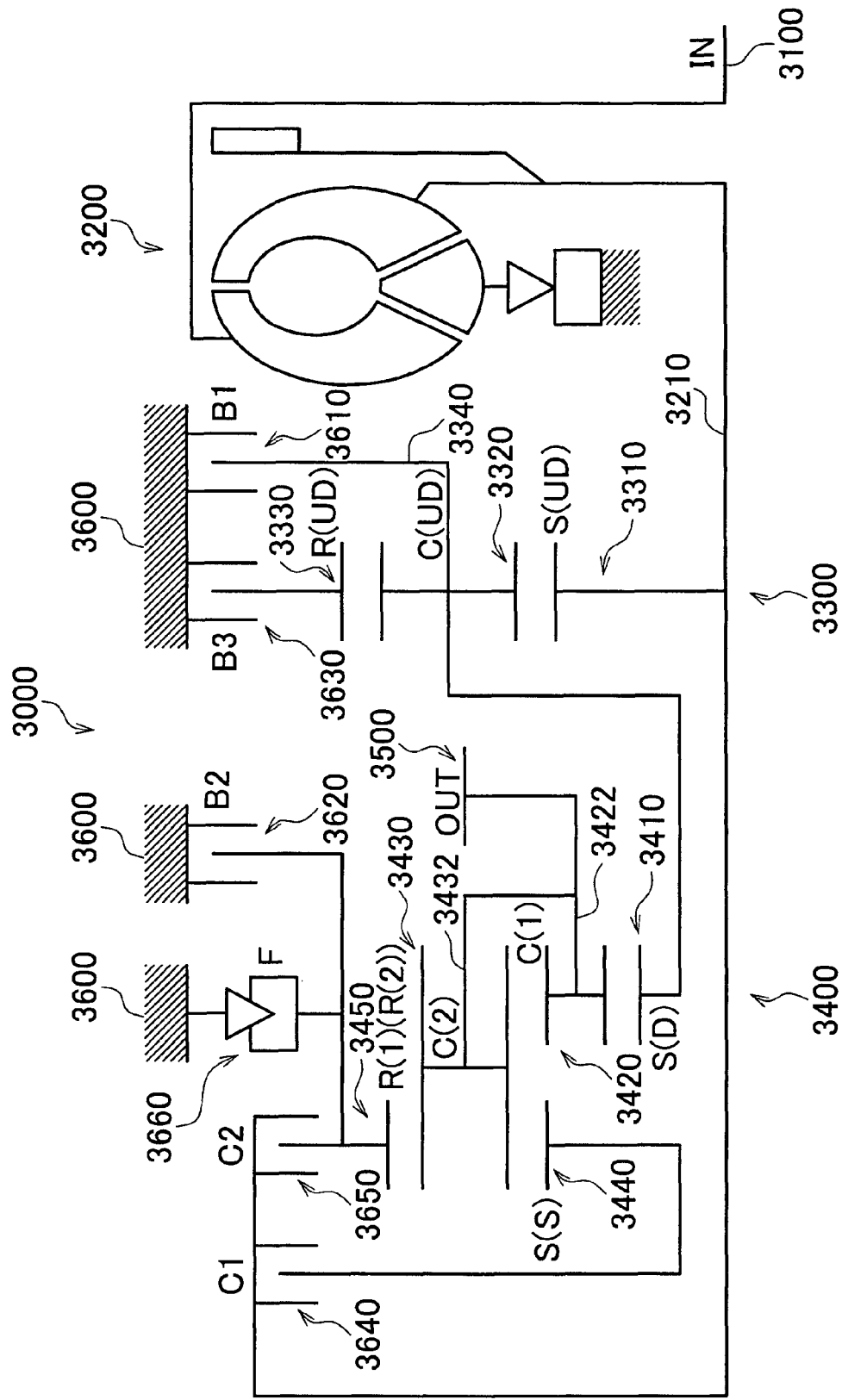
FIG. 2 is a skeleton diagram showing the planetary gear unit of an automatic transmission.

The planetary gear unit 3000 will be described with reference to FIG. 2. The planetary gear unit 3000 is connected to the torque converter 3200 that includes the input shaft 3100 connected to the crankshaft. The planetary gear unit 3000 includes a first planetary gear set 3300, a second planetary gear set 3400, an output gear 3500, a B1 brake 3610, a B2 brake 3620, and a B3 brake 3630, a C1 clutch 3640 and a C2 clutch 3650, and a one-way clutch F3660. The B1 brake 3610, B2 brake 3620, and B3 brake 3630 are fixed to the gear case 3600.

The first planetary gear set 3300 is a single pinion type planetary gear mechanism. The first planetary gear set 3300 includes a sun gear S (UD) 3310, a pinion 3320, a ring gear R (UD) 3330, and a carrier C (UD) 3340.

The sun gear S (UD) 3310 is connected to the output shaft 3210 of the torque converter 3200. The pinion 3320 is rotatably supported by the carrier C (UD) 3340. The pinion 3320 engages with the sun gear S (UD) 3310 and ring gear R (UD) 3330.

The ring gear R (UD) 3330 is fixed to the gear case 3600 by the B3 brake 3630. The carrier C (UD) 3340 is fixed to the gear case 3600 by the B1 brake 3610.

The second planetary gear set 3400 is a Ravigneaux type planetary gear mechanism. The second planetary gear set 3400 includes a sun gear S (D) 3410, a short pinion 3420, a carrier C (1) 3422, a long pinion 3430, a carrier C (2) 3432, a sun gear S (S) 3440, and a ring gear R (1) (R (2)) 3450.

The sun gear S (D) 3410 is connected to the carrier C (UD) 3340. The short pinion 3420 is rotatably supported by the carrier C (1) 3422. The short pinion 3420 engages with the sun gear S (D) 3410, and long pinion 3430. The carrier C (1) 3422 is connected to the output gear 3500.

The long pinion 3430 is rotatably supported by the carrier C (2) 3432. The long gear 3430 engages with the short pinion 3420, sun gear S (S) 3440, and ring gear R (1) (R (2)) 3450. The carrier C (2) 3432 is connected to the output gear 3500.

The sun gear S (S) 3440 is connected to the output shaft 3210 of the torque converter 3200 by the C1 clutch 3640. The ring gear R (1) (R (2)) 3450 is fixed to the gear case 3600 by the B2 brake 3620, and connected to the output shaft 3210 of the torque converter 3200 by the C2 clutch 3650. The ring gear R (1) (R (2)) 3450 is connected to the one-way clutch F3660. When the engine drives the wheels in the first gear, the ring gear R (1) (R (2)) 3450 is prevented from rotating.

The one-way clutch F3660 is provided in parallel with the B2 brake 3620. That is, the outer race of the one-way clutch F3660 is fixed to the gear case 3600. The inner race of the one-way clutch F3660 is connected to the ring gear R (1) (R (2)) 3450 via a rotation shaft.

FIG. 3 is an operation table that shows the relation between the gears and the operating states of the clutches and brakes. By operating the brakes and clutches as shown in the operation table, one of the first gear to the sixth gear, and a reverse gear is selected.

Figure 4:
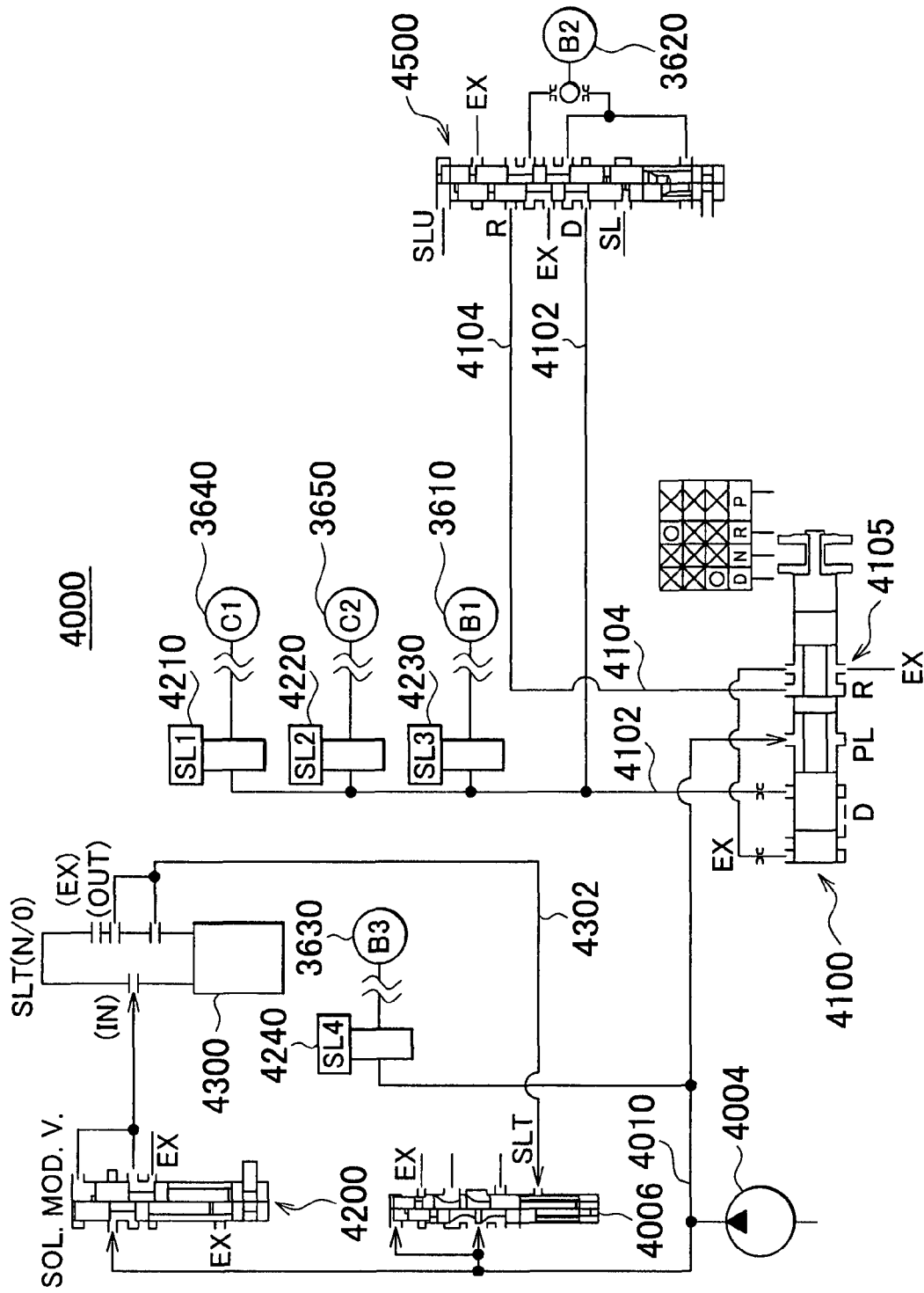
FIG. 4 is a diagram showing the hydraulic circuit of the automatic transmission.

As shown in FIG. 4, the main part of the hydraulic circuit 4000 will be described. The hydraulic circuit 4000 is not limited to the circuit described below.

The hydraulic circuit 4000 includes an oil pump 4004, a primary regulator valve 4006, a manual valve 4100, a solenoid modulator valve 4200, an SL1 linear solenoid (hereinafter, simply referred to as SL (1)) 4210, an SL2 linear solenoid (hereinafter, simply referred to as SL (2)) 4220, an SL3 linear solenoid (hereinafter, simply referred to as SL (3)) 4230, an SL4 linear solenoid (hereinafter, simply referred to as SL (4)) 4240, an SLT linear solenoid (hereinafter, simply referred to as SLT) 4300, and a B2 control valve 4500.

The oil pump 4004 is connected to the crankshaft of the engine 1000. By rotating the crankshaft, the oil pump 4004 generates a hydraulic pressure. The primary regulator valve 4006 regulates the hydraulic pressure generated by the oil pump 4004, which is the source pressure, to a line pressure.

The primary regulator valve 4006 is operated by a throttle pressure that functions as a pilot pressure. The SLT 4300 regulates a solenoid modulator pressure to the throttle pressure, as described later. The line pressure is supplied to the manual valve 4100 via a line pressure oil passage 4010.

The manual valve 4100 includes a drain port 4105. The hydraulic pressure in a D-range pressure oil passage 4102 and the hydraulic pressure in an R-range pressure oil passage 4104 are discharged through the drain port 4105. When the spool of the manual valve 4100 is at the position D, communication is provided between the line pressure oil passage 4010 and the D-range pressure oil passage 4102, and thus, the hydraulic pressure is supplied to the D-range pressure oil passage 4102. At this time, communication is provided between the R-range pressure oil passage 4104 and the drain port 4105, and thus, the R-range pressure in the R-range pressure oil passage 4104 is discharged through the drain port 4105.

When the spool of the manual valve 4100 is at position R, communication is provided between the line pressure oil passage 4010 and the R-range pressure oil passage 4104, and thus, the hydraulic pressure is supplied to the R-range pressure oil passage 4104. At this time, communication is provided between the D-range pressure oil passage 4102 and the drain port 4105, and thus, the D-range pressure in the D-range pressure oil passage 4102 is discharged through the drain port 4105.

When the spool of the manual valve 4100 is at the position N, communication is provided between the D-range pressure oil passage 4102 and the drain port 4105, and between the R-range pressure oil passage 4104 and the drain port 4105. Thus, the D-range pressure in the D-range pressure oil passage 4102 and the R-range pressure in the R-range pressure oil passage 4104 are discharged through the drain port 4105.

The hydraulic pressure supplied to the D-range pressure oil passage 4102 is finally supplied to the B1 brake 3610, B2 brake 3620, C1 clutch 3640, and C2 clutch 3650. The hydraulic pressure supplied to the R-range pressure oil passage 4104 is finally supplied to the B2 brake 3620.

The solenoid modulator valve 4200 regulates the line pressure, which is the source pressure, to the constant solenoid modulator pressure to be supplied to the SLT 4300.

The SL (1) 4210 regulates a hydraulic pressure to be supplied to the C1 clutch 3640. The SL (2) 4220 regulates a hydraulic pressure to be supplied to the C2 clutch 3650. The SL (3) 4230 regulates a hydraulic pressure to be supplied to the B1 brake 3610. The SL (4) 4240 regulates a hydraulic pressure to be supplied to the B3 brake 3630.

The SLT 4300 regulates the solenoid modulator pressure, which is the source pressure, to the throttle pressure according to a control signal from the ECU 8000. The ECU 8000 transmits the control signal based on the accelerator-pedal operation amount detected by the accelerator-pedal operation amount sensor 8010. The throttle pressure is supplied to the primary regulator valve 4006 via an SLT oil passage 4302. The throttle pressure is used as the pilot pressure for the primary regulator valve 4006.

The SL (1) 4210, SL (2) 4220, SL (3) 4230, SL (4) 4240, and SLT 4300 are controlled by the control signals transmitted from the ECU 8000.

The B2 control valve 4500 selectively supplies the hydraulic pressure in the D-range pressure oil passage 4102 or the hydraulic pressure in the R-range pressure oil passage 4104 to the B2 brake 3620. The B2 control valve 4500 is connected to the D-range pressure oil passage 4102 and the R-range pressure oil passage 4104. The B2 control valve 4500 is controlled by the hydraulic pressure supplied from an SL solenoid valve (not shown) and the hydraulic pressure supplied from an SLU solenoid valve (not shown), and the impelling force of a spring.

When the SL solenoid valve is off, and the SLU solenoid valve is on, the B2 control valve 4500 is in the state as shown in the left half of the B2 control valve 4500 in FIG. 4. In this case, the B2 control valve 4500 is operated by the hydraulic pressure supplied from the SLU solenoid valve, which functions as the pilot pressure. Thus, the B2 control valve 4500 regulates the D-range pressure, and supplies the regulated D-range pressure to the B2 brake 3620.

When the SL solenoid valve is on, and the SLU solenoid valve is off, the B2 control valve 4500 is in the state as shown in the right half of the B2 control valve 4500 in FIG. 4. In this case, the B2 control valve 4500 supplies the R-range pressure to the B2 brake 3620.

Figure 5:
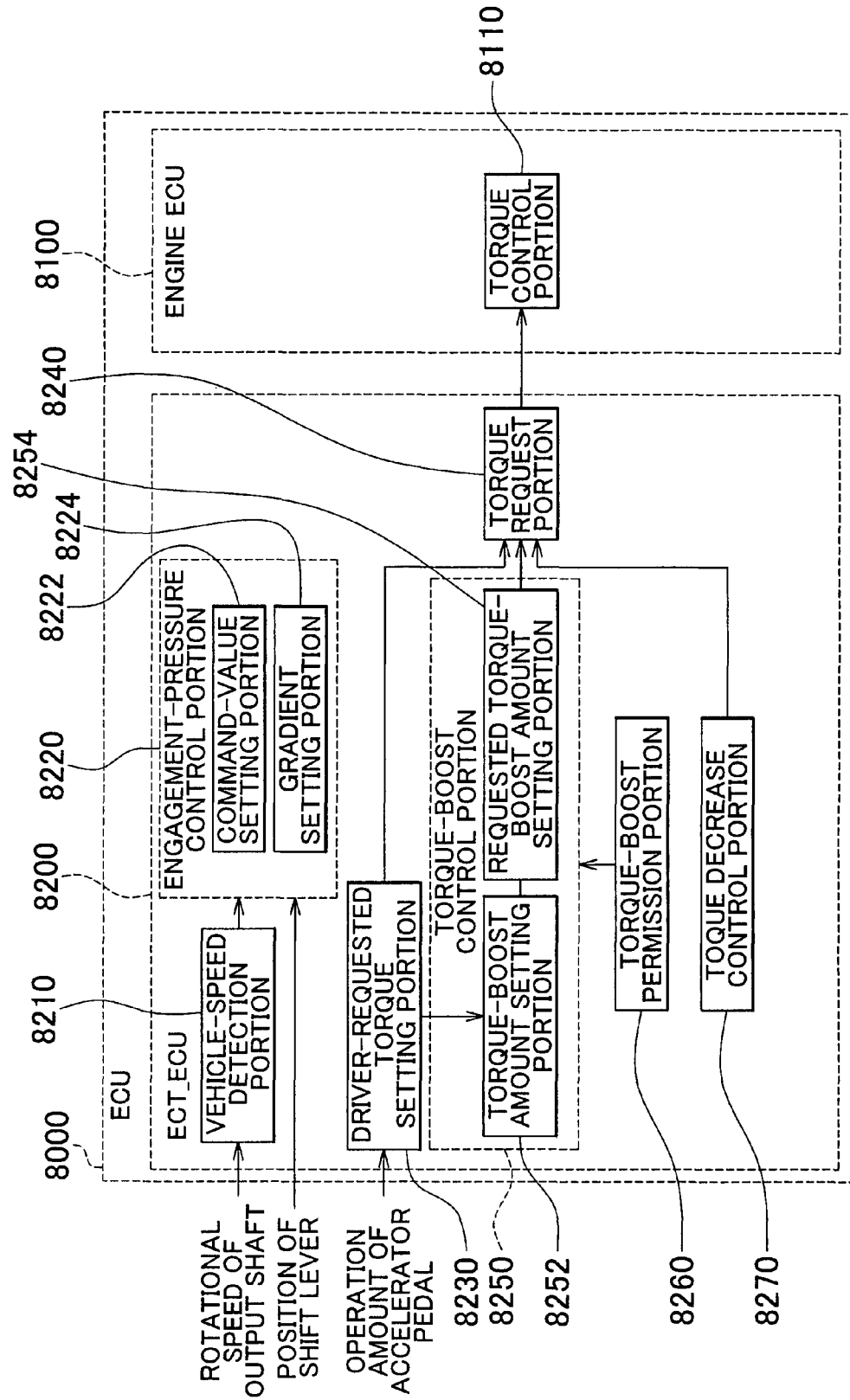
FIG. 5 is a function block diagram showing an ECU according to an embodiment of the invention.

The ECU 8000 will be further described with reference to FIG. 5. The function of the ECU 8000 described below may be implemented through hardware or software.

The engine ECU 8100 of the ECU 8000 includes a torque control portion 8110. The torque control portion 8110 receives the signal that indicates the requested torque amount from the ECT_ECU 8200. Then, the torque control portion 8110 controls the opening amount of the electronic throttle valve 8016 and the timing at which an ignition plug ignites air-fuel mixture so that the actual torque output from the engine 1000 is equal to the requested torque amount.

The ECT_ECU 8200 of the ECU 8000 includes a vehicle-speed detection portion 8210, an engagement-pressure control portion 8220, a driver-requested torque setting portion 8230, a torque request portion 8240, a torque-boost control portion 8250, a torque-boost permission portion 8260, and a torque decrease control portion 8270.

The vehicle-speed detection portion 8210 calculates (detects) the vehicle speed based on the rotational speed NO of the output shaft of the automatic transmission 2000. The engagement-pressure control portion 8220 controls the engagement pressures for the B1 brake 3610, B2 brake 3620, B3 brake 3630, C1 clutch 3640, and C2 clutch 3650 during the gear shift, and after the gear shift ends.

The engagement-pressure control portion 8220 includes a command-value setting portion 8222, and a gradient setting portion 8224. The command-value setting portion 8222 sets the command value of the engagement pressure for a friction engagement element to be engaged when the automatic transmission 2000 shifts (upshifts). More specifically, the command-value setting portion 8222 sets the command value used during the torque phase, based on parameters, that is, the combination of gears selected before and after the upshift, and the torque output from the engine 1000 estimated based on the amount of intake air.

The command-value setting portion 8222 sets the command value of the engagement pressure using maps. The map selected when a torque-boost control (described later) is executed (permitted) during the torque phase differs from the map selected when the torque-boost control is not executed (permitted) during the torque phase.

When the torque-boost control is executed, the command value of the engagement pressure is set to a larger value than when the torque-boost control is not executed, as long as the combination of the gears selected before and after the gear shift, and the torque requested by the driver when the torque-boost control is executed are the same as those when the torque-boost control is not executed.

The gradient setting portion 8224 sets the gradient of the engagement pressure for the friction engagement element to be engaged when the automatic transmission 2000 shifts (upshifts). More specifically, the gradient setting portion 8224 sets the gradient used to gradually increase the engagement pressure for the friction engagement element during the inertia phase, based on the parameters, that is, the combination of the gears selected before and after the gear shift, and the torque output from the engine 1000 estimated based on the amount of intake air.

The gradient setting portion 8224 sets the gradient using maps. The map selected when the torque-boost control is executed during the torque phase differs from the map selected when the torque-boost control is not executed during the torque phase. When the torque-boost control is executed, the gradient is set to a smaller value than when the torque-boost control is not executed, as long as the combination of the gears selected before and after the gear shift, and the torque output from the engine 1000 when the torque-boost control is executed are the same as those when the torque-boost control is not executed.

The driver-requested torque setting portion 8230 sets a driver-requested torque based on the operation amount of the accelerator pedal, and the like. The driver-requested torque is the torque requested by the driver. As the operation amount of the accelerator pedal increases, the driver-requested torque increases.

The torque request portion 8240 sets the requested torque amount based on the driver-requested torque, and the like. The requested torque amount is the torque required of the engine 1000. For example, when the automatic transmission 2000 is not shifting, and accordingly the vehicle is steadily moving, the requested torque amount is set to the driver-requested torque.

The torque-boost control portion 8250 executes the torque-boost control that boosts the torque during the torque phase when the automatic transmission 2000 upshifts. The torque-boost control portion 8250 includes a torque-boost amount setting portion 8252 and a requested torque-boost amount setting portion 8254.

The torque-boost amount setting portion 8252 sets a torque-boost amount that is the amount by which the torque output from the engine 1000 needs to be boosted by the torque-boost control. The torque-boost amount is set based on the driver-requested torque, that is, the operation amount of the accelerator pedal.

The requested torque-boost amount setting portion 8254 sets a requested torque-boost amount to increase the torque output from the engine 1000 by the torque-boost amount in a predetermined manner during the torque phase when the automatic transmission 2000 upshifts. That is, the requested torque-boost amount gradually increases, and finally reaches the torque-boost amount.

When the torque-boost control is executed, the torque request portion 8240 sets the requested torque amount to the sum of the requested torque-boost amount and the driver-requested torque.

When a predetermined permission condition is satisfied, the torque-boost permission portion 8260 permits the torque-boost control during the torque phase. When the predetermined permission condition is not satisfied, the torque-boost permission portion 8260 prohibits the torque-boost control during the torque phase.

The predetermined permission condition may be at least one of a condition where the control characteristic of the automatic transmission 2000 is stable; a condition where the retardation of the ignition timing of the engine 1000 is permitted; a condition where the accuracy of executing the torque-boost control is stable; a condition where no malfunction occurs in sensors and actuators required for executing the torque-boost control; and a condition where the torque-boost control does not interfere with other controls.

The control characteristic of the automatic transmission 2000 may be stable, for example, when the temperature of ATF is equal to or above a threshold value, and/or there is a record showing that the ATF has been charged into the piston cylinder of the hydraulic servo for at least one of the B1 brake 3610, B2 brake 3620, B3 brake 3630, C1 clutch 3640, and C2 clutch 3650, after the vehicle starts (i.e., after the ignition switch is turned on).

There may be a record showing that the ATF has been charged into the piston cylinder of the hydraulic servo, for example, when the period during which electric power supplied to each linear solenoid is equal to or above a threshold value, and/or the automatic transmission 2000 has shifted at least once after the vehicle starts.

The retardation of the ignition timing of the engine 1000 may be permitted, for example, when the coolant temperature is equal to or above a predetermined value, and the retardation of the ignition timing is not prohibited to protect a catalyst (not shown). The retardation of the ignition timing may be prohibited to protect the catalyst, for example, when the temperature of the catalyst is estimated to be higher than a threshold value.

The accuracy of executing the torque-boost control may be stable, for example, when the ignition timing is not retarded due to knocking.

The sensors required for executing the torque-boost control may include, for example, the coolant-temperature sensor 8002, accelerator-pedal operation amount sensor 8010, throttle-valve opening amount sensor 8018, engine speed sensor 8020, input-shaft rotational speed sensor 8022, output-shaft rotational speed sensor 8024, and oil-temperature sensor 8026. The actuators required for executing the torque-boost control may include, for example, the motor for driving the electronic throttle valve 8016.

The torque-boost control may not interfere with the other controls, for example, when a VSC (Vehicle Stability Control) is not executed, a TRC (Traction Control) is not executed, and/or a control that suppresses a sharp change in the opening amount of the electronic throttle valve 8016 is not executed during acceleration. The VSC automatically controls the torque output from the engine 1000 and the braking force to suppress the skid of the vehicle. The TRC automatically controls the torque output from the engine 1000 to suppress the slip of the vehicle when the vehicle starts and when the vehicle is accelerating.

Further, the permission condition may be satisfied, for example, when the opening amount of the electronic throttle valve 8016 is equal to or below a threshold value, the D-range is selected in the automatic transmission 2000, and/or the automatic transmission 2000 automatically upshifts based on a shift diagram.

The torque decrease control portion 8270 executes a torque decrease control that decreases the torque during the inertia phase when the automatic transmission 2000 upshifts. During the torque decrease control, the torque decrease control portion 8270 sets a requested torque to decrease the torque to a predetermined value lower than the driver-requested torque. During the torque decrease control, the torque request portion 8240 sets the requested torque amount to the requested torque set by the torque decrease control portion 8270.

Figure 6:
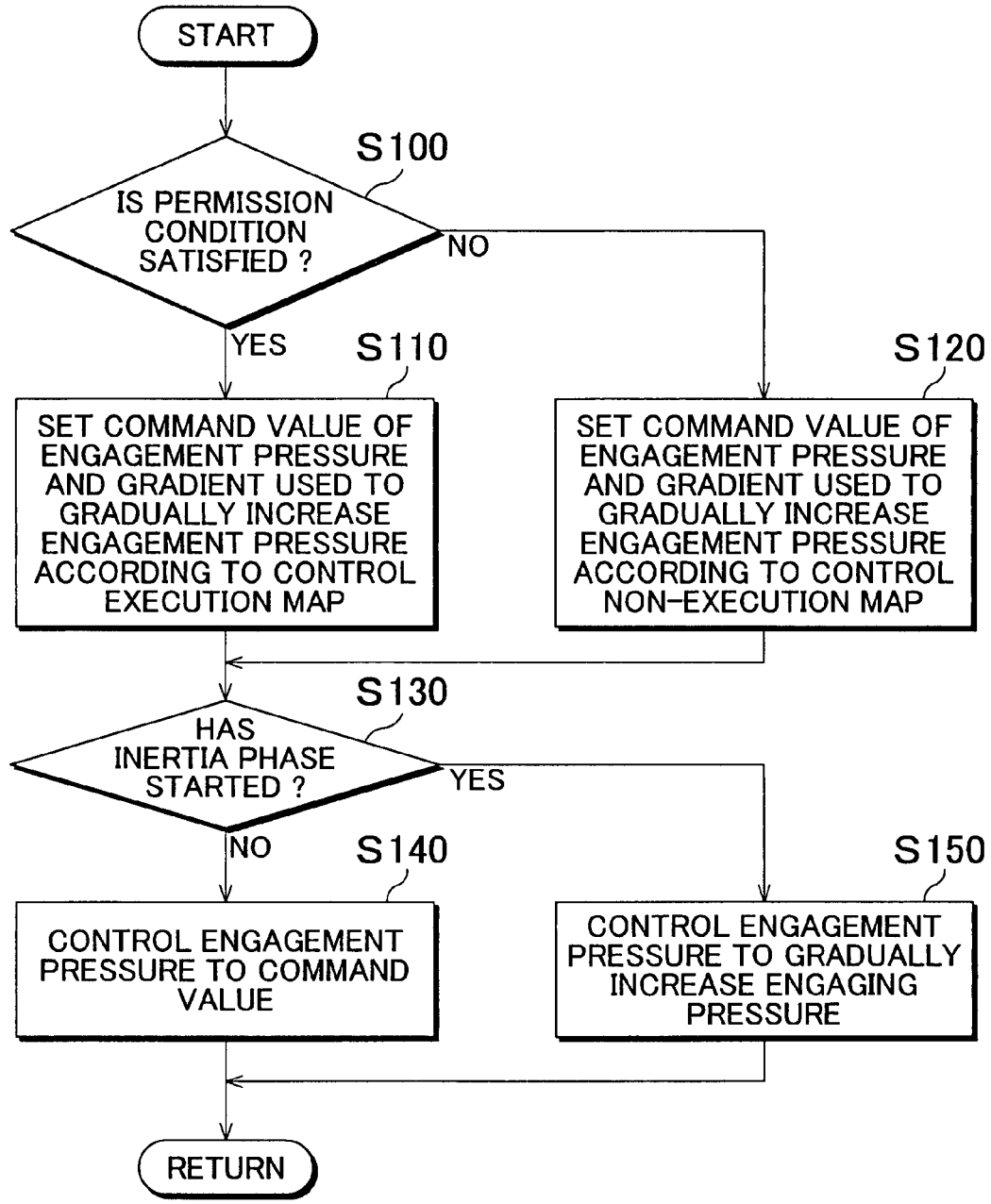
FIG. 6 is a flowchart showing a routine executed by the ECU according to the embodiment of the invention.

The routine executed by the ECU 8000 during the upshift will be described with reference to the flowchart in FIG. 6. The ECU 8000 functions as the control apparatus according to the embodiment. The routine described below is periodically executed at predetermined intervals.

In step S100, the ECU 8000 determines whether the permission condition for permitting the torque-boost control during the torque phase is satisfied. When the permission condition is satisfied (YES in step S100), the routine proceeds to step S110. When the permission control is not satisfied (NO in step S100), the routine proceeds to step S1120.

In step S110, the ECU 8000 sets the command value of the engagement pressure for the friction engagement element to be engaged, according to the map selected when the torque-boost control is executed, that is, when the torque-boost control is permitted (hereinafter, referred to as "control execution map"). The command value is used during the torque phase. In addition, the ECU 8000 sets the gradient used to gradually increase the engagement pressure during the inertia phase, according to the control execution map.

In step S120, the ECU 8000 sets the command value of the engagement pressure for the friction engagement element to be engaged, according to the map selected when the torque-boost control is not executed, that is, when the torque-boost control is prohibited (hereinafter, referred to as "control non-execution map"). The command value is used during the torque phase. In addition, the ECU 8000 sets the gradient used to gradually increase the engagement pressure during the inertia phase, according to the control non-execution map.

In step S130, the ECU 8000 determines whether the inertia phase has started. The ECU 8000 determines that the inertia phase has started, when the rotational speed NI of the input shaft of the automatic transmission 2000 is lower than a value obtained by multiplying the rotational speed NO of the output shaft of the automatic transmission 2000 by the gear ratio of the gear selected before the gear shift (upshift) starts. The method of determining whether the inertia phase has started is not limited to this method. When the inertia phase has started (YES in step S130), the routine proceeds to step S150. When the inertia phase has not started (NO in step S130), the routine proceeds to step S1140.

In step S140, the ECU 8000 controls the engagement pressure for the friction engagement element to be engaged so that the engagement pressure is equal to the set command value during the torque phase. In step S150, the ECU 8000 controls the engagement pressure for the friction engagement element to be engaged so that the engagement pressure gradually increases at the set gradient during the inertia phase.

The operation of the ECU 8000 based on the above-described structure and routine will be described. The ECU 8000 functions as the control apparatus according to this embodiment.

When the automatic transmission 2000 upshifts, and the permission condition is not satisfied (NO in step S100), the torque-boost control is not executed during the torque phase. In this case, the requested torque amount, which is the torque required of the engine 1000, is set to the driver-requested torque indicated by the chain line in FIG. 7 during the torque phase.

In this case, the ECU 8000 sets the command value of the engagement pressure for the friction engagement element to be engaged, according to the control non-execution map. The command value is used during the torque phase. In addition, the ECU 8000 sets the gradient used to gradually increase the engagement pressure during the inertia phase, according to the control non-execution map (S120).

When the inertia phase has not started (NO in step S130), that is, during the torque phase, the ECU 8000 controls the engagement pressure for the friction engagement element to be engaged so that the engagement pressure is equal to the set command value.

When the inertia phase has started (YES in step S130), the ECU 8000 controls the engagement pressure for the friction engagement element to be engaged, during the inertia phase. As a result, the engagement pressure is changed as shown by the two-dot chain line in FIG. 7, during the torque phase and the inertia phase.

When the automatic transmission 2000 upshifts, and the permission condition is satisfied (YES in step S100), the torque-boost control is executed during the torque phase. In this case, during the torque phase, the requested torque amount is set to the sum of the requested torque-boost amount and the driver-requested torque, as shown by the solid line in FIG. 7.

In this case, the ECU 8000 sets the command value of the engagement pressure for the friction engagement element to be engaged, according to the control execution map. The command value is used during the torque phase. In addition, the ECU 8000 sets the gradient used to gradually increase the engagement pressure during the inertia phase, according to the control execution map (S110).

When the inertia phase has not started (NO in step S130), that is, during the torque phase, the ECU 8000 controls the engagement pressure for the friction engagement element to be engaged so that the engagement pressure is equal to the set command value.

When the inertia phase has started (YES in step S130), the ECU 8000 controls the engagement pressure for the friction engagement element to be engaged so that the engagement pressure gradually increases at the set gradient during the inertia phase. As a result, the engagement pressure is changed as shown by the solid line in FIG. 7, during the torque phase and the inertia phase.

When the torque-boost control is executed, the torque input to the automatic transmission 2000 is greater than when the torque-boost control is not executed. Therefore, when the torque-boost control is executed, a greater engagement pressure is needed to perform the upshift than when the torque-boost control is not executed.

Accordingly, as shown in FIG. 7, when the torque-boost control is executed, the command value of the engagement pressure used during the torque phase is set to a greater value than when the torque-boost control is not executed.

Thus, if the torque-boost control is executed, and after the inertia phase starts, the engagement pressure is gradually increased at the same gradient as when the torque-boost control is not executed, the engagement pressure would be higher than necessary at the end of the inertia phase, that is, when the friction engagement element is engaged.

Thus, as shown in FIG. 7, when the torque-boost control is executed, the gradient used to gradually increase the engagement pressure during the inertia phase is set to a smaller value than when the torque-boost control is not executed. This reduces the possibility that the engagement pressure is higher than necessary at the end of the inertia phase.

As described above, when the torque-boost control is executed, the ECU 8000 sets the command value of the engagement pressure used during the torque phase to a greater value than when the torque-boost control is not executed. In addition, the ECU 8000 sets the gradient used to increase the engagement pressure during the inertia phase to a smaller value than when the torque-boost control is not executed. This reduces the possibility that the engagement pressure is higher than necessary at the end of the inertia phase. As a result, it is possible to reduce a shock when the automatic transmission 2000 shifts, and the friction engagement element is engaged.

In this embodiment, the torque-boost control is permitted or prohibited. Alternatively, the upper limit value of the torque-boost amount may be set, and the torque-boost amount may be, or may not be limited to the upper limit value during the torque-boost control.

In this case, when the torque-boost amount is not limited during the torque-boost control, the command value of the engagement pressure used during the torque phase may be set to a greater value than when the torque-boost amount is limited. In addition, when the torque-boost amount is not limited during the torque-boost control, the gradient used to increase the engagement pressure during the inertia phase may be set to a smaller value than when the torque-boost amount is limited. The phrase "the torque-boost control should not be restricted" according to the invention signifies the case where the torque-boost control is executed, and the torque-boost amount, by which the torque is boosted, is not limited to an upper limit value. The phrase "the torque-boost control should be restricted" according to the invention signifies that the case where the torque-boost control is prohibited, or the case where the torque-boost control is executed, but the torque-boost amount, by which the torque is boosted, is limited to an upper limit value.

The embodiment of the invention that has been described in the specification is to be considered in all respects as illustrative and not restrictive. The technical scope of the invention is defined by claims, and all changes which come within the meaning and range of equivalency of the claims are therefore intended to be embraced therein.

What is claimed is:

1. A control apparatus for a vehicle that includes a power source, and an automatic transmission, connected to the power source, in which a gear is selected from among a plurality of gears with different gear ratios by selectively engaging a plurality of friction engagement elements, wherein the control apparatus boosts torque output from the power source during a torque phase when the automatic transmission upshifts, the control apparatus comprising:

an engagement-pressure control portion that controls an engagement pressure for a friction engagement element to be engaged when the automatic transmission upshifts so that the engagement pressure increases to a predetermined pressure during the torque phase, and the engagement pressure increases from the predetermined pressure at a predetermined gradient when an inertia phase starts;

a torque-boost permission portion that determines whether torque boost has been restricted during the torque phase, wherein when the torque-boost permission portion determines that the torque boost has not been restricted, the engagement-pressure control portion sets the predetermined pressure to a greater value, and sets the predetermined gradient to a smaller value than when the torque-boost permission portion determines that the torque boost has been restricted.

2. The control apparatus for the vehicle according to claim 1, wherein when a predetermined condition is satisfied, the torque-boost permission portion determines that the torque boost has not been restricted.

3. The control apparatus for the vehicle according to claim 2, wherein the predetermined condition is at least one of a condition where a control characteristic of the automatic transmission is stable; a condition where retardation of an ignition timing of the power source is permitted; a condition where accuracy of the torque boost is stable; a condition where no malfunction occurs in a sensor and an actuator required for executing the torque boost; and a condition where the torque boost does not interfere with another control of the torque output from the power source.

4. The control apparatus for the vehicle according to claim 1, wherein torque boost is prohibited when the torque-boost permission portion determines that the torque boost has been restricted.

5. The control apparatus for the vehicle according to claim 1, wherein the a torque-boost amount, by which the torque is boosted, is limited to an upper limit value when the torque-boost permission portion determines that the torque boost has been restricted.

6. The control apparatus for the vehicle according to claim 1, wherein:

the predetermined pressure and the predetermined gradient are set using predetermined first and second maps each of which shows values of the engagement pressure and values of the gradient;

the predetermined first map is selected when the torque-boost permission portion determines that the torque boost has not been restricted; and the predetermined second map is selected when the torque-boost permission portion determines that the torque boost has been restricted.

7. A method of controlling a vehicle that includes a power source, and an automatic transmission, connected to the power source, in which a gear is selected from among a plurality of gears with different gear ratios by selectively engaging a plurality of friction engagement elements, wherein the method boosts torque output from the power source during a torque phase when the automatic transmission upshifts, the method comprising:

controlling an engagement pressure for a friction engagement element to be engaged when the automatic transmission upshifts so that the engagement pressure increases to a predetermined pressure during the torque phase, and the engagement pressure increases from the predetermined pressure at a predetermined gradient when an inertia phase starts;

determining whether torque boost has been restricted during the torque phase; and when it is determined that the torque boost has not been restricted, setting the predetermined pressure to a greater value, and setting the predetermined gradient to a smaller value than when it is determined that the torque boost has been restricted.

8. A control apparatus for a vehicle that includes a power source, and an automatic transmission, connected to the power source, in which a gear is selected from among a plurality of gears with different gear ratios by selectively engaging a plurality of friction engagement elements, wherein the control apparatus boosts torque output from the power source during a torque phase when the automatic transmission upshifts, the control apparatus comprising:

means for controlling an engagement pressure for a friction engagement element to be engaged when the automatic transmission upshifts so that the engagement pressure increases to a predetermined pressure during a torque phase, and the engagement pressure increases from the predetermined pressure at a predetermined gradient when an inertia phase starts;

means for determining whether torque boost has been restricted during the torque phase; and means for, when it is determined that the torque boost has not been restricted, setting the predetermined pressure to a greater value, and setting the predetermined gradient to a smaller value than when it is determined that the torque boost has been restricted.

* * * * *